United States Patent
Tsai et al.

(10) Patent No.: US 6,915,458 B2
(45) Date of Patent: Jul. 5, 2005

(54) PCI BUS CYCLE SINGLE-STEP INTERRUPTION DEBUG CARD

(75) Inventors: Chun-Nan Tsai, Hsin-Chu (TW); Hou-Li Chu, Hsin-Chu (TW); Chih-Hao Feng, Hsin-Chu Hsien (TW)

(73) Assignee: Mitac International Corp., Hsinchu (TW)

( * ) Notice: Subject to any disclaimer, the term of this patent is extended or adjusted under 35 U.S.C. 154(b) by 1030 days.

(21) Appl. No.: 09/805,578

(22) Filed: Mar. 14, 2001

(65) Prior Publication Data

US 2001/0052115 A1 Dec. 13, 2001

(30) Foreign Application Priority Data

Mar. 29, 2000 (TW) ........................................ 89105767 A

(51) Int. Cl.$^7$ .............................................. G06F 11/00
(52) U.S. Cl. .......................................... 714/43; 710/15
(58) Field of Search .............................. 714/43, 44, 46, 714/47, 48, 56, 39, 27; 710/100, 101, 15, 18

(56) References Cited

U.S. PATENT DOCUMENTS

| | | | | | |
|---|---|---|---|---|---|
| 5,838,899 | A | * | 11/1998 | Leavitt et al. | 714/56 |
| 6,032,271 | A | * | 2/2000 | Goodrum et al. | 714/56 |
| 6,123,735 | A | * | 9/2000 | Raghavan et al. | 703/21 |
| 6,751,754 | B2 | * | 6/2004 | Tsai et al. | 714/43 |

* cited by examiner

*Primary Examiner*—Nadeem Iqbal
(74) *Attorney, Agent, or Firm*—Rabin & Berdo, P.C.

(57) ABSTRACT

The single-step debug card using the PCI interface according to the present invention utilizes a bus master to send out an REQ# signal to request issuing a control during the PCI bus cycle to be inspected. The address, data, command, and byte enable (BE#) of the bus cycle are locked and displayed through LEDs for single-step debugging. Through a switch circuit, a TRDY# ready signal is sent out. A device selection signal (DEVSEL#) is raised to HIGH at the same time the TRDY# ready signal finishes so as to notify the bus master on the single-step interruption debug card to end the cycle for single-step debugging.

13 Claims, 3 Drawing Sheets

PCI BUS CYCLE SINGLE-STEP INTERRUPTION DEBUG CARD

BACKGROUND OF THE INVENTION

1. Field of Invention

The present invention relates to a single-step debug card and, in particular, to a single-step debug card using the peripheral component interconnect (PCI) interface.

2. Related Art

FIG. 1 depicts a structural block diagram of a computer system commonly used nowadays. Obviously, the CPU 10 connects to a north bridge (NB, a chipset) 30 through a CPU bus 20. Other than connecting to memory 40 (which can be SDRAM, EDORAM, etc), the NB 30 also connects to an AGP VGA card 60 through an AGP bus 50. The NB 30 also connects to a south bridge (SB, also a chipset) 80 through a PCI bus 70 for transferring data and information. Other than connecting with the hard drive (HD) 90, the CD-ROM 100, the universal serial bus (USB) 110, input devices (such as the mouse and keyboard) 120 for retrieving or inputting data, the SB 80 also connects to the basic input/output system (BIOS) 150 and the audio device (such as a sound blaster card) 160 through an XD bus 130 and an ISA bus 140, respectively.

The conventional single step interruption debug card is applied to an industry standard architecture (ISA) bus for terminating the IOCHRDY signal of the ISA bus cycle and forcing it to be at the low voltage. The object is to elongate the bus cycle so as to inspect the related address and the state of the data line bus.

On the PCI bus, the access of the CPU to the conventional BIOS has to first transfer the access cycle from the PCI bus to the ISA bus through a PCI/ISA bridge. After the BIOS data is read out by ROM on the ISA bus, the data are sent from the ISA bus back to the PCI bus through the PCI/ISA bridge. Since the BIOS data access cycle on the PCI bus has to be responded through and by the PCI/ISA bridge, that is, the relevant PCI cycle control signals such as DEVSEL# and TRDY# have to be generated by the PCI/ISA bridge, it is impossible to suspend the bus cycle by simply keeping the signals that terminate the PCI cycle (such as TRDY#) at the high voltage.

The debug cards for the PCI bus available on the market have to rely on the assistance of the ISA bus interruption debug cards so as to force the IOCHRDY signal that terminate the ISA bus cycle to be at the low voltage, thus elongating the lifetime of the bus cycle. Or alternatively, at the beginning of booting the computer, part of the BIOS data and address are latched into buffer memory and are read out later. This does not really suspend the bus cycle to perform the real-time inspection function.

SUMMARY OF THE INVENTION

For a normal PCI bus cycle, when the FRAME# signal changes from HIGH to LOW, it signals the start of a PCI bus cycle. At this moment, the one shown on the AD bus is the address that the PCI bus cycle wants to position while the one shown on the C/BE# bus is the command. Each device on the PCI bus cycle will perform decoding on the address and command to ensure that whether it is a target device of the PCI bus cycle. If so, then the DEVSEL# signal is sent out and maintained at LOW as a response. Once the target device finishes reading/writing, it sends out a TRDY# signal to notify the PCI host to perform subsequent data transmission actions. If any bus master sends out a REQ# signal to claim for the control of bus during the bus cycle and the PCI arbiter also responds a GNT# signal, then the bus master obtains the control of the next bus cycle after the current bus cycle completes. That is, relevant control signals such as the FRAME#, IRDY#, address and command are sent out by the bus master.

The single-step debug card using the PCI interface according to the invention utilizes the above bus master function to send out an REQ# signal to request issuing a control during the PCI bus cycle to be inspected. The address, data, command, and byte enable (BE#) of the bus cycle are locked and displayed through LEDs. When the PCI arbiter responds the acknowledgement signal GNT#, the single-step debug card sends out specific signals like the address, command, FRAME# and IRDY#. After the specific address and command are decoded by the target device on the single-step debug card, a DEVSEL# signal is sent out by the target device and is maintained at LOW. By suspending the actions on the PCI bus using the bus master cycle, the signal states such as the address, data, command and BE# locked during the previous cycle keep being shown on the LEDs for single-step debugging. Finally through a switch circuit, a TRDY# ready signal is sent out. A device selection signal (DEVSEL#) is raised to HIGH at the same time the TRDY# ready signal finishes so as to notify the bus master on the single-step interruption debug card to end the cycle for single-step debugging.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 2:
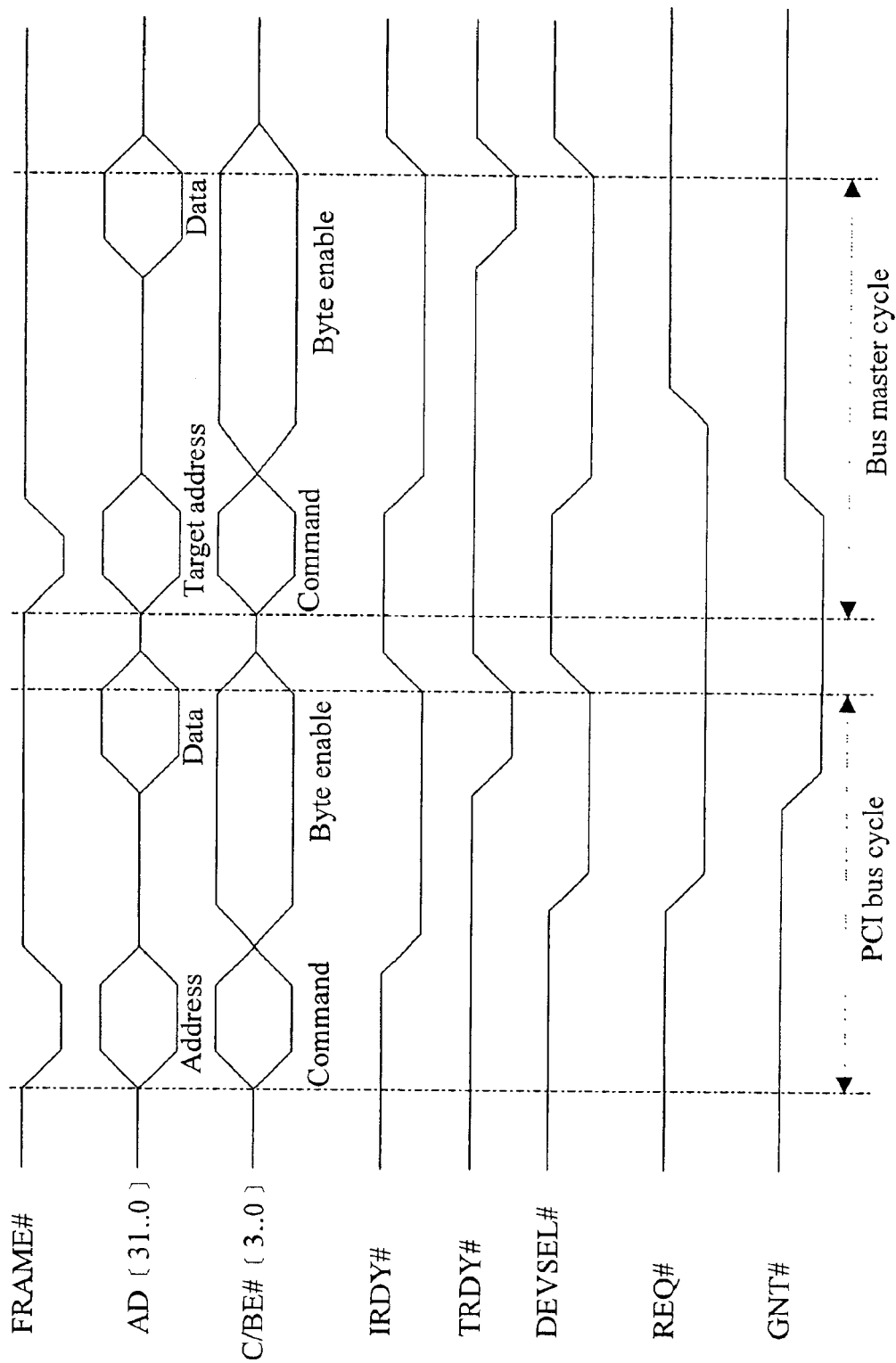
FIG. 2 is a time-ordered diagram of an embodiment of the invention that depicts the relation between the transmission frequencies of different buses and the sampling time orders generated according to the PCI bus transmission frequencies.

The time ordered diagram of an embodiment according to the invention is shown in FIG. 2, which depicts the relation between the transmission frequencies of different buses and the sampling time orders generated according to the PCI bus transmission frequencies. For a normal PCI bus cycle, when the FRAME# signal changes from HIGH to LOW, it signals the beginning of a PCI bus cycle. At this moment, the one shown on the AD bus is the address that the PCI bus cycle wants to position while the one shown on the C/BE# bus is the command. Each device on the PCI bus cycle will perform decoding on the address and command to ensure that whether it is a target device of the PCI bus cycle. If so, then the device selection signal DEVSEL# is set to keep at LOW as a response. When the target device finishes reading/writing, it sends out a TRDY# ready signal to notify the PCI host for performing subsequent data transmission. If any bus master sends out a REQ# signal to claim for the control of bus during the bus cycle and the PCI arbiter also responds a GNT# signal, then the bus master obtains the control of the next bus cycle after the current bus cycle completes. That is, relevant control signals such as the FRAME#, IRDY#, address and command are sent out by the bus master.

The single-step debug card using the PCI interface according to the invention utilizes the above bus master function to send out an REQ# signal to request issuing a control during the PCI bus cycle to be inspected. The address, data, command, and byte enable (BE#) of the bus cycle are locked and displayed through LEDs. When the PCI arbiter responds the acknowledgement signal GNT#, the single-step debug card sends out specific signals like the address, command, FRAME# and IRDY#. After the specific address and command are decoded by the target device on the single-step debug card, a DEVSEL# signal is sent out by the target device and is maintained at LOW. By suspending the actions on the PCI bus using the bus master cycle, the signal states such as the address, data, command and BE# locked during the previous cycle keep being shown on the LEDs for single-step debugging. Finally through a switch circuit, a TRDY# ready signal is sent out. A device selection signal (DEVSEL#) is raised to HIGH at the same time the TRDY# ready signal finishes so as to notify the bus master on the single-step interruption debug card to end the cycle for single-step debugging.

Figure 1:
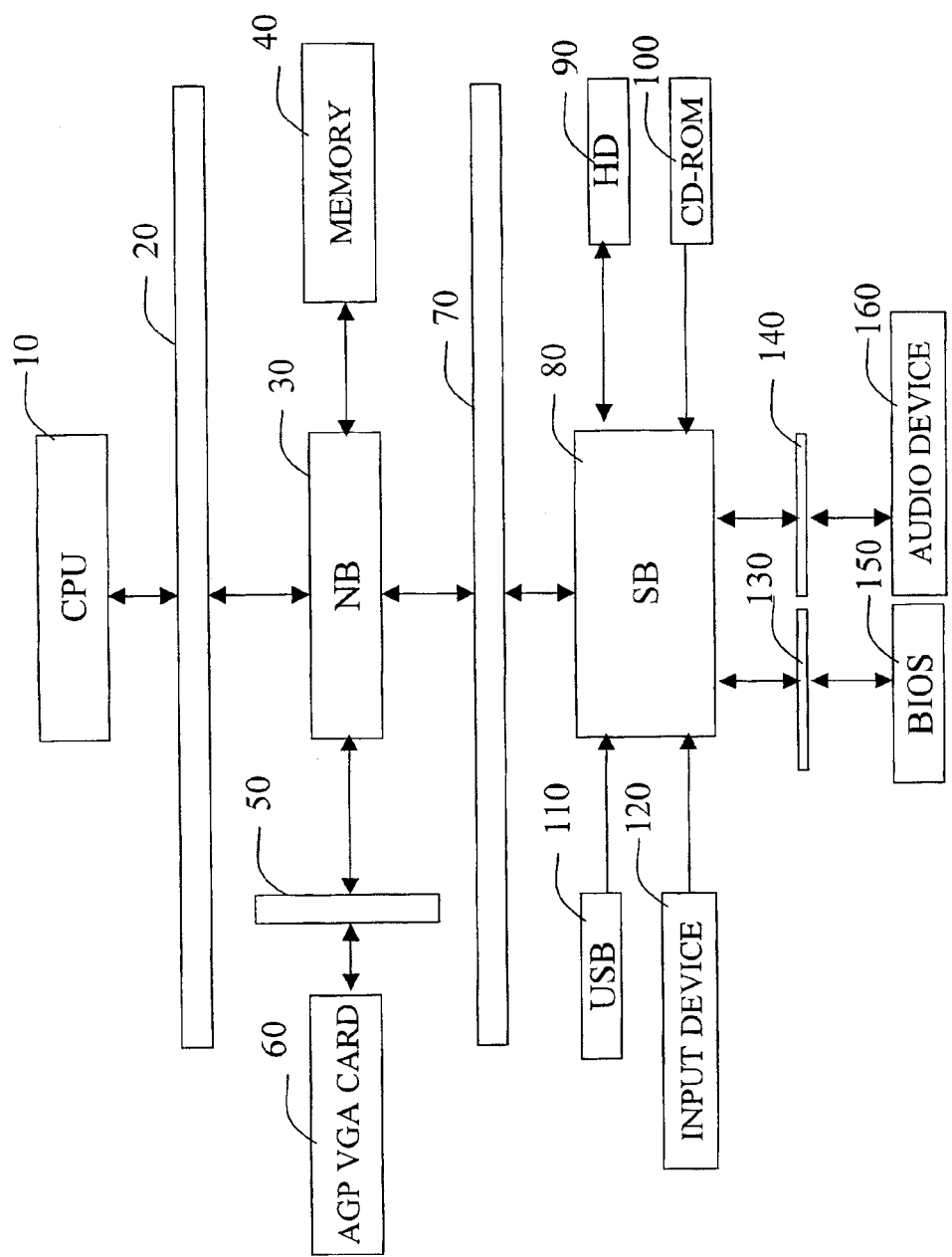
FIG. 1 is a block diagram of the structure of a conventional computer system.
Figure 3:
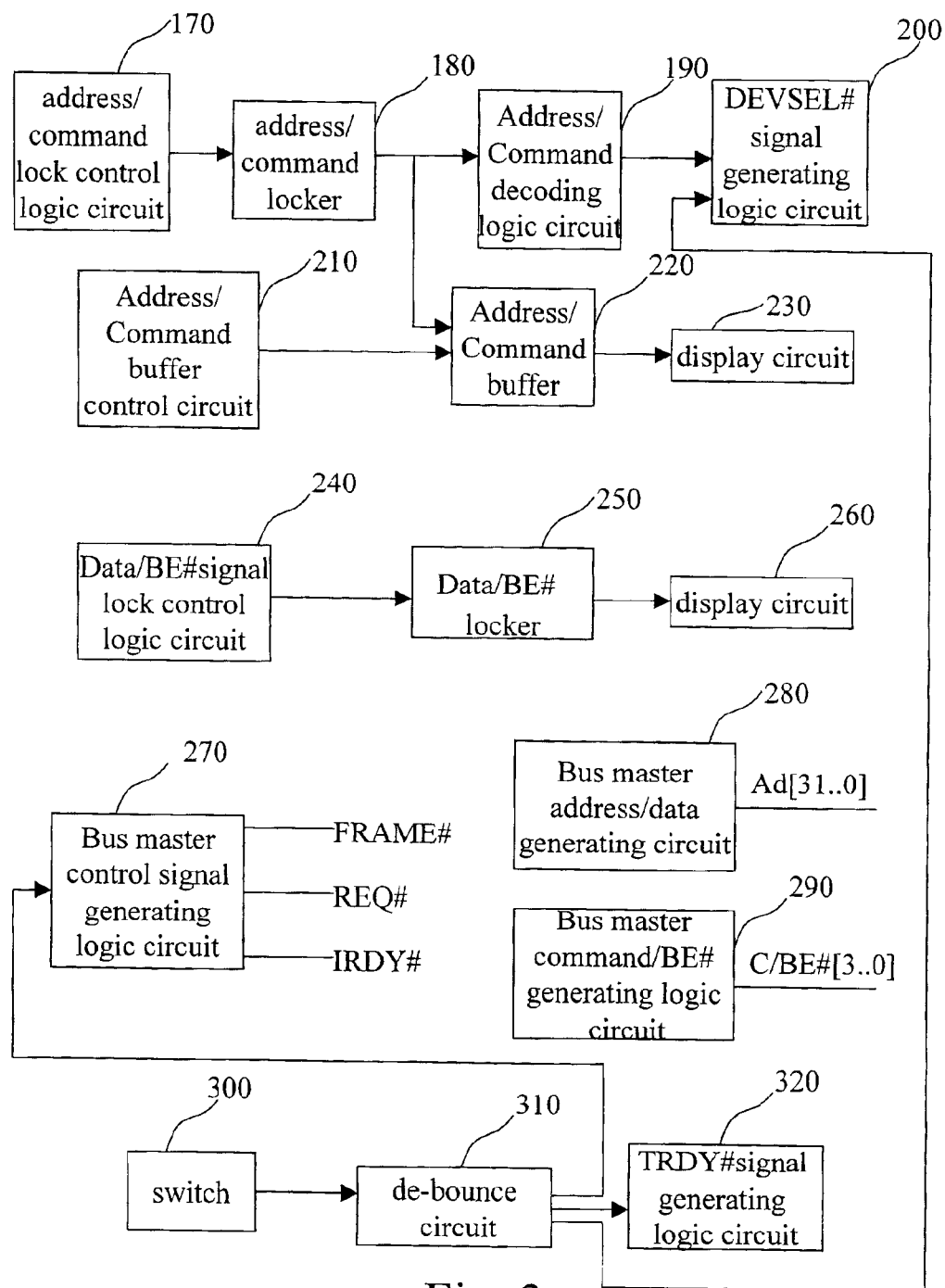
FIG. 3 is a schematic flow chart of the single step debugging according to an embodiment of the invention.

FIG. 3 is a signal flow chart of single step debugging according to an embodiment of the invention. It is hereinafter explained along with FIG. 2:

When the PCI bus cycle to be inspected starts, a PCI host (such as the north bridge 30 in FIG. 1) will place a device address to be located in an AD bus, place a PCI bus command in C/BE# and change the FRAME# signal to LOW. At this moment, each device on the PCI bus will decode the address and command to determine whether it is a target device in the bus cycle. The correct target device will lower the DEVSEL# signal to LOW as a response. Through a control signals generated by an address/command lock control logic circuit 170, the address and command of the bus cycle to be inspected are locked in an address/command locker 180.

The PCI host can lower the IRDY# signal to LOW when starting to read/write. Once the target device finishes reading/writing, TRDY# is changed to LOW. A data/BE# signal lock control logic circuit 240 locks the data and BE# signals of the bus cycle to be inspected in a data/BE# locker 250 when both IRDY# and TRDY# are at LOW. They are also displayed through a display circuit 260. At the same time, the control signals generated by an address/command buffer control circuit 210 opens the output a buffer 220 to display the address and command locked within the locker 180. The output of the buffer 220 only is open when both IRDY# and TRDY# are at LOW during the bus cycle to be inspected and is closed otherwise.

During the bus cycle, a bus master control signal generating logic circuit 270 changes REQ# to LOW so as to request subsequent control of the bus cycle from a PCI arbiter (at the north bridge 30). Once the PCI arbiter lowers the GNT# signal to LOW as an acknowledgement, the bus master on the single-step interruption debug card obtains the control of the bus after the bus cycle finishes.

When the bus master cycle begins a bus master address/data generating circuit 280 and a command/BE# generating logic circuit 290 place specific addresses and commands in the AD and C/BE# buses respectively. The bus master control signal generating logic circuit 270 orderly lowers FRAME# and IRDY# to LOW. To avoid other devices on the bus sending DEVSEL# and TRDY# signals to cause the end of the cycle during the bus master cycle, these specific addresses are used to locate specific target devices on the single-step interruption debug card. After the locker 180 locks the address and command and an address/command decoding logic circuit 190 confirms them, the target device changes DEVSEL# to LOW through a DEVSEL# signal generating logic circuit 200 to respond to this cycle. Since the output of the buffer 220 is kept closed, the specific address and command sent out by the bus master will not be displayed.

When the switch 300 is depressed, an on/off switching signal is generated. A de-bounce circuit 310 eliminates the de-bouncing during the switch. The target device lowers the TRDY# signal to LOW through a TRDY# signal generating logic circuit 320 and lasts for one PCI clock, then it raises it to HIGH. The DEVSEL# signal is raised to HIGH by the DEVSEL# signal generating logic circuit 200. At the same moment, the bus master also raises IRDY# to HIGH through the bus master control signal generating circuit 270 to end this bus master cycle. Since the bus master cycle is locked the signals states such as the address, data, command and BE# displayed and in the buffer are continuously displayed through the display circuits 230, 260. The bus master control signal generating circuit 270 raises REQ# to HIGH during the bus mater cycle so that the bus master hands over the control of the bus when the bus master cycle finishes and allows the PCI bus to continue the next cycle after the interrupted cycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of single-step interruption debugging applied in a peripheral component interconnect (PCI) bus cycle, which comprises the steps of:

sending out a request signal (REQ#) from a bus master to request for the control of the bus cycle;

locking the signal states such as the address, data, command and byte enable (BE#) of the bus cycle and displaying them through a display;

sending out the address, the command, a frame signal (FRAME#) and an IRDY# ready signal in the next bus cycle after a PCI arbiter responds a acknowledge signal (ACK#);

decoding the address and command through a target device and sending out a device selection signal (DEVSEL#) from the target device;

displaying the signal states such as the address, the data, the command, the byte enable locked in the previous bus cycle on the display; and sending out a TRDY# ready signal through a switch to end the PCI bus cycle.

2. The method of claim 1, wherein the step of sending out a device selection signal from the target device is achieved by maintaining the device selection signal at LOW so as to suspend the actions on the PCI bus during the bus master cycle.

3. The method of claim 1, wherein the step of ending the PCI bus cycle is achieved by raising the device selection signal to HIGH at the same time the IRDY# ready signal finishes so as to notify the bus master to end the bus cycle.

4. The method of claim 1, wherein the switch comprises a de-bounce circuit to eliminate unexpected de-bouncing generated during the on/off switch.

5. A single-step interruption debug card applied to a peripheral component interconnect (PCI) bus cycle, which debug card comprises:
   an address/command lock control logic circuit for generating an address/command control signal and locking the address/command through an address/command locker;
   an address/command buffer control logic circuit, which outputs a control signal through the locked address/command to an address/command buffer;
   a data/byte enable (BE#) signal lock control logic circuit for generating the lock control signal of a data/BE# bus and locking the data/BE# signal using a data/BE# signal locker;
   a bus master control signal generating logic circuit for sending out a request signal (REQ#) to request for the control over the bus; and
   a switch, which sends out a TRDY# ready signal to notify the bus master on the PCI bus cycle single-step interruption debug card to end the PCI bus cycle.

6. The debug card of claim 5, wherein the address/command lock control logic circuit further comprises an address/command decoding logic circuit for decoding the address/command so as to determine whether the address/command is a target device in the PCI bus cycle.

7. The debug card of claim 6 further comprising that a device selection signal (DEVSEL#) is sent out in the next PCI bus cycle as a response using a device selection signal generating logic circuit when the target device is in the PCI bus cycle.

8. The debug card of claim 5, wherein the address/command buffer displays through a display circuit the address/command to perform inspection.

9. The debug card of claim 5, wherein the data/BE# signal locker displays through a display circuit the data/BE# to perform inspection.

10. The debug card of claim 5, wherein the bus master control signal generating logic circuit displays the address/data signal states locked in the previous PCI bus cycle on a display through a bus master address/data generating logic circuit.

11. The debug card of claim 5, wherein the bus master control signal generating logic circuit displays the command/BE# signal states locked in the previous PCI bus cycle on a display through a bus master cornmand/BE# generating logic circuit.

12. The debug card of claim 5, wherein the PCI bus cycle is ended by raising the device selection signal to HIGH when the TRDY# ready signal finishes so as to notify the bus master on the PCI bus cycle single-step interruption debug card to end the PCI bus cycle.

13. The debug card of claim 5, wherein the switch utilizes a de-bounce circuit to eliminate unexpected de-bouncing during the on/off switch.

* * * * *